United States Patent
Sweeting et al.

(10) Patent No.: US 10,486,565 B2
(45) Date of Patent: Nov. 26, 2019

(54) DUAL FIRMNESS FOAM FLEX POINT ELIMINATION

(71) Applicant: LEAR CORPORATION, Southfield, MI (US)

(72) Inventors: Doug Sweeting, Farmington Hills, MI (US); William Webster, Davison, MI (US); Marc Adam Rosenbrock, Royal Oak, MI (US)

(73) Assignee: LEAR CORPORATION, Southfield, MI (US)

( * ) Notice: Subject to any disclaimer, the term of this patent is extended or adjusted under 35 U.S.C. 154(b) by 89 days.

(21) Appl. No.: 15/906,009

(22) Filed: Feb. 27, 2018

(65) Prior Publication Data

US 2018/0326880 A1    Nov. 15, 2018

Related U.S. Application Data

(60) Provisional application No. 62/503,422, filed on May 9, 2017.

(51) Int. Cl.
| | |
|---|---|
| *B60N 2/64* | (2006.01) |
| *B60N 2/58* | (2006.01) |
| *B60N 2/70* | (2006.01) |
| *A47C 27/16* | (2006.01) |

(52) U.S. Cl.
CPC .......... *B60N 2/646* (2013.01); *B60N 2/5833* (2013.01); *B60N 2/7017* (2013.01); *A47C 27/16* (2013.01); *B60N 2/64* (2013.01); *B60N 2/643* (2013.01)

(58) Field of Classification Search
CPC .......... B60N 2/646; B60N 2/643; B60N 2/64; A47C 27/16

USPC ........... 297/452.21, 452.29, 452.28, 452.37, 297/452.38, 452.23, 452.33
See application file for complete search history.

(56) References Cited

U.S. PATENT DOCUMENTS

| | | | | |
|---|---|---|---|---|
| 3,924,893 A | * | 12/1975 | Ferrara ................ | B60N 2/5621 297/452.46 |
| 6,371,562 B1 | * | 4/2002 | Yoshimura ............ | B29C 44/569 156/245 |
| 7,934,774 B2 | | 5/2011 | Galbreath et al. | |
| 8,511,754 B2 | * | 8/2013 | Leponce ................ | B60N 2/002 297/180.12 |
| 9,056,560 B2 | * | 6/2015 | Perrin ..................... | B60N 2/24 |
| 9,056,568 B2 | * | 6/2015 | Matsumoto .......... | B60N 2/4228 |

(Continued)

FOREIGN PATENT DOCUMENTS

FR    3037878    12/2016

*Primary Examiner* — Syed A Islam
(74) *Attorney, Agent, or Firm* — Brooks Kushman P.C.

(57) ABSTRACT

A dual firmness vehicle seat and a method of forming the same is provided. In an embodiment, a vehicle seat assembly includes a seat bottom, and a seatback disposed on the seat bottom. At least one of the seat bottom and seatback includes a first cushion region having a first initial load deflection value, and a second cushion region having a second initial load deflection value different from the first initial load deflection value. The seat assembly further includes a non-continuous trench defined by and between the first cushion region and the second cushion region and having a base forming a cavity therebetween, and connecting regions disposed within the cavity above the base extending between the first and second cushion regions to inhibit flexing between the first and second cushion regions.

20 Claims, 4 Drawing Sheets

(56) References Cited

U.S. PATENT DOCUMENTS

| | | | |
|---|---|---|---|
| 9,393,893 B2* | 7/2016 | Kozaki | B60N 2/58 |
| 9,616,791 B2* | 4/2017 | Awata | B60N 2/5825 |
| 9,849,814 B2* | 12/2017 | Sahashi | B60N 2/643 |
| 9,925,899 B2* | 3/2018 | Mogi | B60N 2/5642 |
| 10,029,592 B2* | 7/2018 | Ochiai | B60N 2/5883 |
| 10,124,699 B2* | 11/2018 | Galbreath | B60N 2/99 |
| 2002/0001694 A1 | 1/2002 | Wetzel | |
| 2012/0175935 A1* | 7/2012 | Severinski | B60N 2/5891 |
| | | | 297/452.38 |
| 2015/0360597 A1* | 12/2015 | Galbreath | B60N 2/70 |
| | | | 297/452.38 |
| 2016/0052435 A1* | 2/2016 | Nakada | B60N 2/646 |
| | | | 297/452.48 |
| 2016/0096462 A1* | 4/2016 | Kromm | B60N 2/5816 |
| | | | 297/452.38 |
| 2016/0114712 A1 | 4/2016 | Rossi et al. | |
| 2017/0113588 A1 | 4/2017 | Ochiai et al. | |
| 2018/0022253 A1* | 1/2018 | Akimoto | B68G 7/052 |
| | | | 297/452.38 |

* cited by examiner

DUAL FIRMNESS FOAM FLEX POINT ELIMINATION

CROSS-REFERENCE TO RELATED APPLICATIONS

This application claims the benefit of U.S. provisional application Ser. No. 62/503,422 filed May 9, 2017, the disclosure of which is hereby incorporated in its entirety by reference herein.

TECHNICAL FIELD

The present application is directed to a dual firmness vehicle seat cushion.

BACKGROUND

Vehicle seats having seat bottoms and seatbacks include foam cushions for support. To provide comfort as well as support, the seat bottom or seatback component may be a dual firmness seat component such that regions of the component have different hardness to optimize the comfort and support provided by the different regions of the seat component. For example, the cushion may have side bolsters that include a firmer region of foam than the seatback cushion region. When trim covers are attached to dual firmness seat components, wrinkles may form in the trim cover at flex points between different hardness regions, thus affecting the visual appearance of the seat. These wrinkles may be more readily susceptible to form at flex points near trim cover tie downs.

SUMMARY

According to an embodiment, a dual firmness seat cushion of a vehicle seat assembly is provided. The vehicle seat assembly includes a seat bottom, and a seatback disposed on the seat bottom. At least one of the seat bottom and seatback includes a cushion. The cushion includes a first cushion region having a first initial load deflection value, and a second cushion region having a second initial load deflection value different from the first initial load deflection value. The seat assembly further includes a non-continuous trench between the first cushion region and the second cushion region and having a base forming a cavity therebetween, and connecting regions disposed within the cavity above the base to inhibit flexing between the first and second cushion regions.

According to another embodiment, a vehicle seat cushion is provided. The vehicle seat cushion includes a first cushion region having a first initial load deflection value, and a second cushion region having a second initial load deflection value, different from the first initial load deflection value. The seat cushion further includes a non-continuous trench defined by and between the first and second cushion regions and having a base forming a cavity therebetween. The seat cushion also includes connecting regions within the cavity above the base of the non-continuous trench, extending between the first cushion region and the second cushion region to inhibit flexing between the first and second cushion regions.

According to yet another embodiment, a method of making a vehicle seat assembly is provided. The method includes providing a vehicle seat bottom, providing a vehicle seatback, disposing the vehicle seatback on the vehicle seat bottom to form the vehicle seat assembly, and attaching a trim cover to the seat assembly via at least one trim attachment feature. At least one of the seat bottom and seatback includes a cushion comprising a first cushion region having a first initial load deflection value, a second cushion region having a second initial load deflection value different from the first, a non-continuous trench defined by and between the first and second cushion regions and having a base forming a cavity in the cushion therebetween, and connecting regions within the cavity above the base, extending between the first cushion region and the second cushion region to inhibit flexing between the first and second cushion regions.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1:
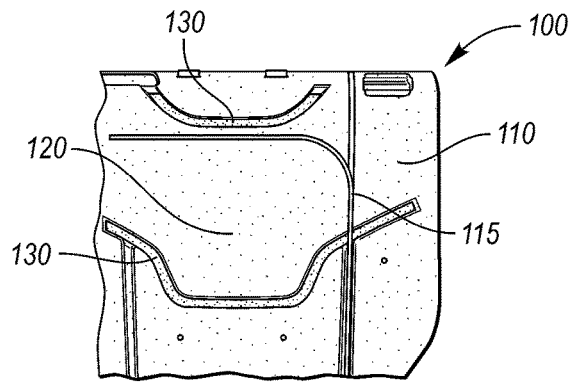
FIG. 1 is a front partial view of a conventional dual firmness vehicle seatback cushion.

Referring to FIG. 1, a conventional vehicle seatback 100 is shown. Conventional seatback 100 includes at least one side bolster 110 and a central region 120. The vehicle seatback 100 is a dual hardness or dual firmness seatback. Dual hardness or dual firmness seat components include cushion regions (or zones) which are harder (or firmer) than other regions of the seatback, thus providing a variation in comfort and support as experienced by an occupant. Typically, the central region 120 of the seatback comprises a softer (less hard) foam, while the peripheral region, such as side bolster 110, is a firmer (or harder) foam. The dual firmness seatback may include any two regions of varying firmness formed from different foam material (such that the density is different), or material processed differently to result in varying foam density, or other foam hardness characteristic, between regions. The difference in firmness in the foam may be, for example, a result of chemical additives in the foam, such as hardening additives in the polyurethane foam, or due to density variations in the foam. The firmness of the foam is measured based on hardness in each specific region. The hardness specifications are measured using the initial load deflection (ILD) value for the different regions of the seatback as measured according to ASTM D3574. The ILD value is a normalized value according to the thickness of the foam in the cushion region tested. A substantial variation in ILD between two regions of the seatback represents a seatback having dual firmness. In some instances, a substantial variation may be a 5% variation, and in other instances the substantial variation may be a 10% variation. In another instance, the substantial variation may be the separation of the ILD of the zones being greater than the tolerances of either zone.

Side bolster 110 and central region 120 include foam cushions having different ILD values, thus resulting in conventional seatback 100 having dual firmness. Continuous trench 115 is defined by and between the side bolster 110 and central region 120. Conventional seatbacks typically include a continuous trench having a width of 10-20 mm. The continuous trench 115 is free or substantially free of foam, or other stiffening member(s), allowing the side bolster 110 to move towards the central region 120, or vice-versa, narrowing the trench 115 when an external force is applied. This relative movement between the two firmness zones is referred to as flexing. The point about which flexing occurs is commonly referred to as a flex point. The continuous trench 115, or the base of the continuous trench, are examples of flex points between side bolster 110 and central region 120, as side bolster 110 and central region 120 are capable of relative movement about the continuous trench 115 and the base of the continuous trench 115.

Figure 2:
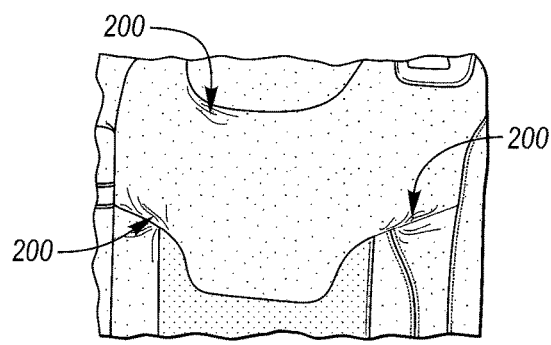
FIG. 2 is a partial view of a conventional dual firmness vehicle seatback with trim.

Conventional seatback 100 also includes at least one trim attachment feature 130 for attaching a trim cover to the seatback 100. The trim attachment feature 130 is positioned according to the desired trim cover design to the seatback. A conventional dual firmness vehicle seatback with a trim cover is shown in FIG. 2. Due to the flexing (or flexibility) between the dual firmness components on either side of the continuous trench in the seatback, contour changes in the trim cover may form wrinkles 200 in the trim cover at the trenches.

Figure 3A:
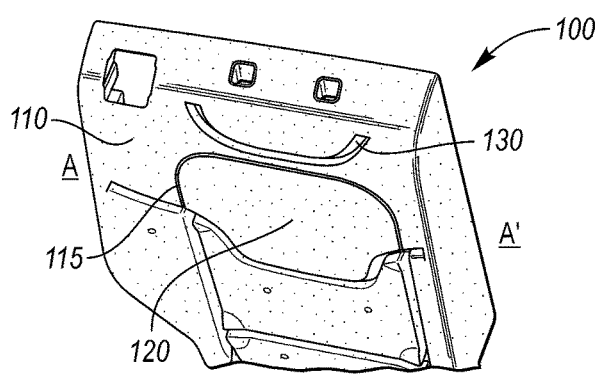
FIG. 3A is a perspective view of a conventional dual firmness vehicle seatback.
Figure 3B:
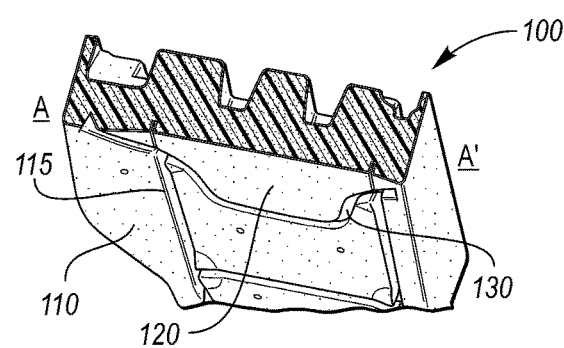
FIG. 3B is a perspective view of the conventional dual firmness vehicle seatback of FIG. 3A with the top section removed along plane A-A'.

Referring to FIGS. 3A & 3B, perspective views of a conventional vehicle seatback 100 and conventional vehicle seatback 100 with the top section removed along plane A-A' are shown, respectively. Typically, the regions of varying firmness, such as side bolster 110 and central region 120, are separated by the continuous trench 115 during production forming the foam regions having different hardness. Continuous trench 115 has a depth according to the mold rail for forming the foam cushion regions of the seatback 100. The continuous trench 115 forms the flex points in the seatback between the dual firmness zones due to the relative flexing between components. When these flex points align with contour changes in the vehicle seatback 100, wrinkles in the attached trim cover may result in these areas upon installation, as shown in FIG. 2.

Figure 4:
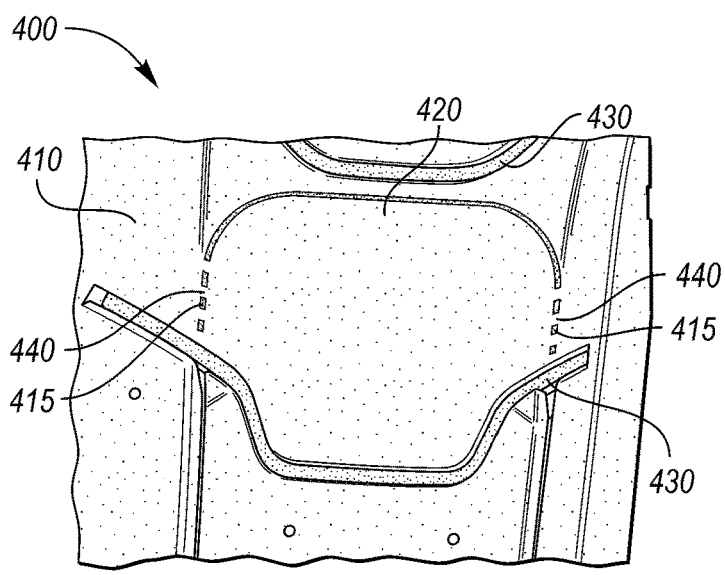
FIG. 4 is a partial schematic view of a dual firmness vehicle seatback according to an embodiment of the present disclosure.
Figure 5A:
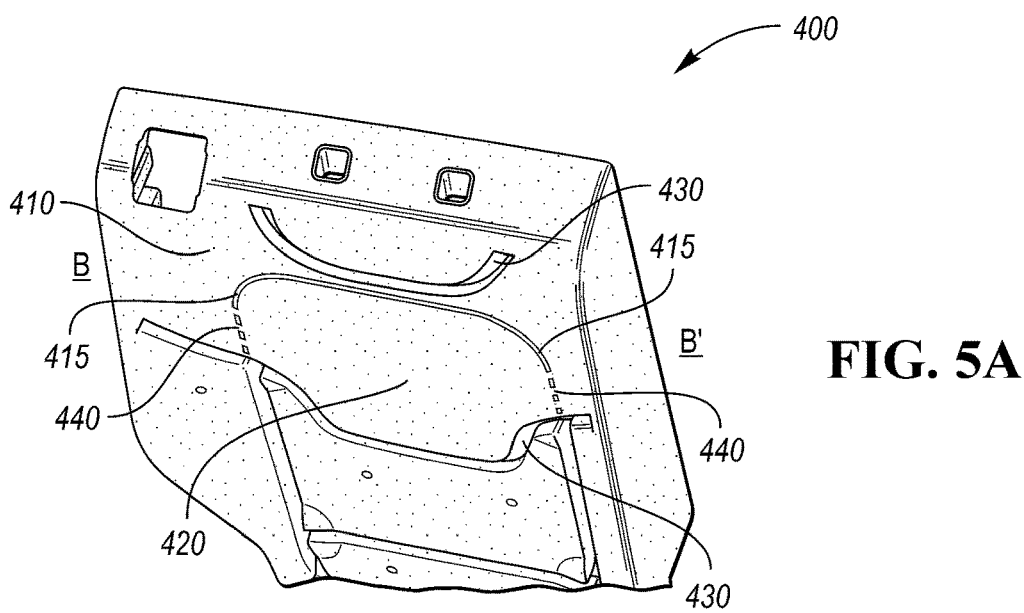
FIG. 5A is a perspective view of a dual firmness vehicle seatback according to an embodiment of the present disclosure.
Figure 5B:
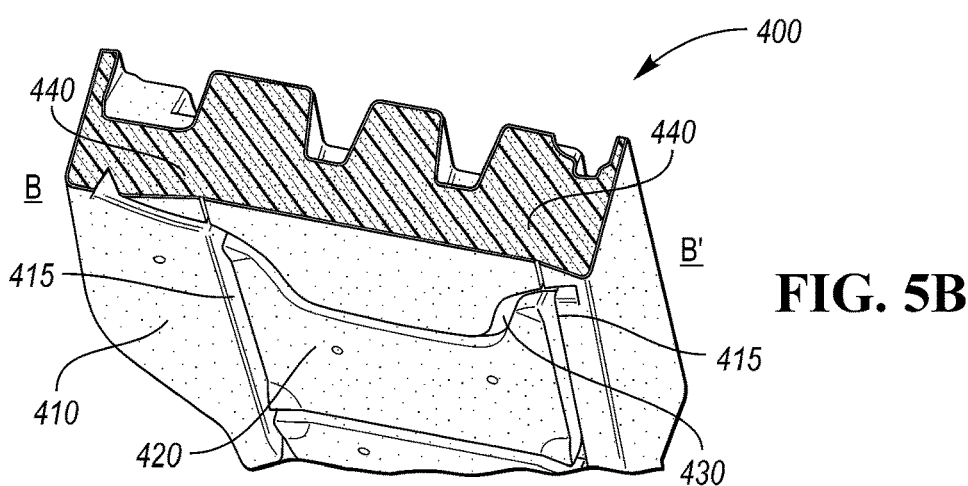
FIG. 5B is a perspective view of the dual firmness vehicle seatback of FIG. 5A with the top section removed along plane B-B'.
Figure 6A:
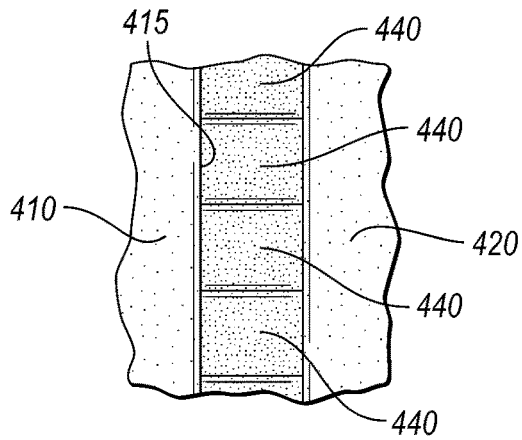
FIGS. 6A-6D are partial schematic diagrams of trenches of dual firmness vehicle seatbacks, according to exemplary embodiments.
Figure 6B:
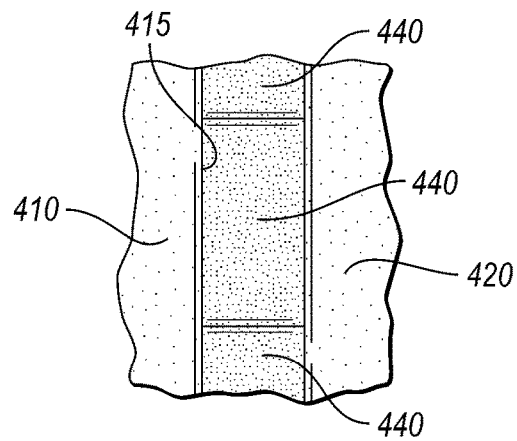
Figure 6C:
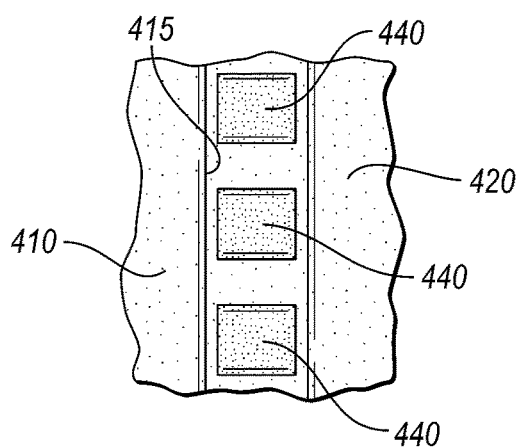
Figure 6D:
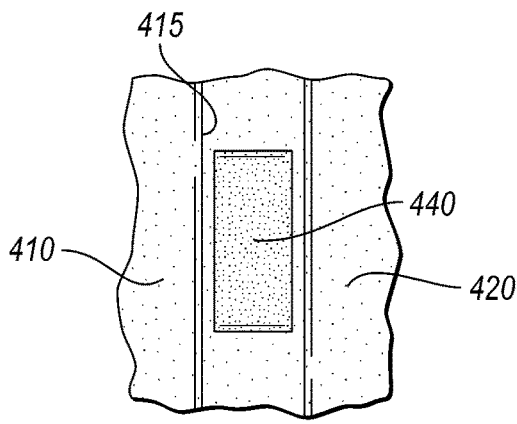

According to an embodiment of the present disclosure, a vehicle seat assembly is disclosed herein. Referring to FIG. 4, an embodiment of a vehicle seatback 400 is shown. Although a vehicle seatback 400 is shown for illustrative purposes, the present disclosure may also apply to a vehicle seat bottom. The seatback 400 may be a component of a front or rear seat assembly. The seatback 400 may include at least one side bolster 410 for providing lateral support and a central region 420. Although a seatback 400 with two side bolsters 410 is shown for illustrative purposes, the seatback 400 may be, for example, a component of a rear seat assembly having only one side bolster 410 on the side of the seat near the vehicle door. Alternatively, in a front seat assembly, the seatback 400 may include two side bolsters 410.

Vehicle seatback 400 is a dual firmness foam cushion and the cushion may include portions forming side bolsters 410 and a central region 420. The foam cushion may include, but is not limited to, polyurethane foam. As a dual firmness seatback, the side bolsters 410 and central region 420 comprise foam cushion regions of varying ILD values. The seatback 400 may include any number of other regions, in addition to or instead of a side bolster, forming dual firmness zones having an ILD different from the central region 420. Although a side bolster and central region of varying firmness is shown, the dual firmness seatback may include any two regions of varying firmness formed from different foam material (such that the density is different), or material processed differently to result in varying foam density between regions. In certain embodiments, regions of the seatback having a first density comprise 30% to 95% of the volume of the seatback, or 50% to 80% of the volume of the seatback. Regions of the seatback having a second density comprise 5% to 30% of the volume of the seatback, or 20% to 50% of the volume of the seatback. In some embodiments, the dual firmness seatback may have a difference in ILD between these regions or portions due to differing characteristics of the foam (or other material) or size based on volume of the seatback. In some embodiments, the dual firmness seatback may have a substantial variation in ILD between these regions of the seatback, such as between the side bolster and central region. The substantial variation between the regions of the seatback may be a 3% to 50% variation, a 5% to 40% variation, or a 7% to 30% variation. In another embodiment, the substantial variation may be the separation of the ILD of the zones being greater than the tolerances of either zone.

Vehicle seatback 400 further includes at least one trim attachment feature 430. Trim attachment feature 430 is provided for attaching a trim cover (not shown) to the vehicle seatback 400. The seatback 400 may include any number of trim attachment features 430, and in any suitable location based on the design of the trim cover. Although trim attachment feature 430 is shown as a portion of a hook-loop fastener (such as Velcro) for illustrative purposes, the trim attachment feature 430 may be any mechanism for physically securing the trim cover to the foam regions such as, but not limited to, hook-loop fasteners, hog ring tie downs, or other tie downs. In an embodiment, the trim cover (not shown) includes an attaching portion (not shown) for attaching the trim cover to the seatback via the trim attachment feature 430. Although the portion of the trim attachment feature 430 is positioned for illustrative purposes, the shape and location of the feature 430 may be any shape or location according to the desired trim cover design for the seatback 400. The trim cover may be any suitable trim cover material such as, but is not limited to, leather, vinyl, or cloth.

In FIG. 4, a non-continuous trench 415 is defined by and between the foam cushions of the side bolster 410 and the central region 420. The non-continuous trench 415 may be formed as a separation between firmness zones, and thus may or may not include trim clips or other trim retention features. The non-continuous trench 415 may be, in some embodiments, 1-5 mm wide, in another embodiment 2-4 mm wide, and in yet another embodiment be 3 mm wide. The non-continuous trench 415 may have a height of, in some embodiments, 5-25 mm, in another embodiment 10-20 mm, and in yet another embodiment 15 mm. The height of the trench 415 may also be referred to as the depth of the trench 415. Although the trench 415 is U-shaped for illustrative purposes, the trench may have any shape or location based on the desired dual firmness regions and design of the vehicle seatback 400.

The non-continuous trench 415 has at least one connecting region 440 for connecting the side bolster 410 with the central region 420. The connecting regions 440 may be filled with a material, such as foam, for inhibiting or substantially reducing the relative flexing motion between the side bolster 410 and the central region 420. The relative flexing is substantially reduced as compared to the relative flexing in a conventional seatback in some embodiments by at least 50%, and in other embodiments by at least 75%. Non-continuous trench 415 may have connecting regions 440 disposed within the depth of the trench 415. The connecting regions 440 may be foam-filled regions providing structure between the side bolster 410 and the central region 420 for inhibiting the relative flexing between the side bolster 410 and the central region 420. By inhibiting the relative flexing, less or no flex points are formed such that the susceptibility to trim wrinkles may be limited. Connecting regions 440 extend between and may connect the side bolster 410 and central region 420 at various points, and fill at least some of the height of the trench 415 above the base of the trench 415, thereby inhibiting the flexibility or flexing between the two dual firmness zones.

As shown in FIGS. 6A-6D, although the shapes of connecting regions 440 are shown as rectangular, the connecting regions 440 may have any shape, size, spacing, and quantity based on design requirements and limiting flexing between the side bolster 410 and central region 420. Similarly, the connecting regions 440 may fill a height or width of the trench 415 according to desired design considerations. For example, although the connecting regions 440 are shown above the trim attachment feature 430, the connecting regions 440 may be disposed anywhere in the trench 415 to inhibit flexing between dual firmness zones, such as, but not limited to, continuous regions 440 or spaced apart regions 440. Connecting regions 440 may include foam having a first density, as used for the side bolster, foam having a second density, as used for the central region, or foam having a third density, disposed between the dual firmness zones to connect the dual firmness zones. In some embodiments, the third density may be the first density, the second density, or a density therebetween. In an embodiment, the third density may be achieved by blending foam of the first and second density. In another embodiment, the foam having the third density may be a foam insert. Based on design considerations, the connecting regions 440 may be formed during the production of the dual firmness seatback 400, or made separately. In addition, the connecting regions 440 may be disposed in the trench 415 based on the trim cover design required for the seatback 400, or design and dual firmness requirements for various zones of the seatback 400. According to another embodiment, the non-continuous trench 415 may be defined by the long connection regions of the two foam regions, with small trench gaps between the long connecting regions.

In some embodiments, some connecting regions 440 may be disposed in the trench 415 above the trim attachment feature 430. In at least one embodiment, each connecting region 440 may independently be 2-25 mm long, in another embodiment 5-15 mm long, and yet another embodiment 10 mm long. In at least one embodiment, each connecting region 440 may independently fill 70-100% of the width of the trench, in another embodiment 75-95% of the width of the trench, and in yet another embodiment the entire width of the trench 415. In at least one embodiment, each connecting region 440 may independently fill 60-100% of the height of the trench, in another embodiment 65-95% of the height of the trench, and in yet another embodiment the entire height of the trench. Connecting regions 440 may be positioned independently apart from each other by 2-25 mm in the trench, in another embodiment by 5-15 mm, and yet another embodiment by 10 mm. The connecting regions 440 may be independently placed from the trim attachment feature 430 and spaced within the trench 415 away from the trim attachment feature 430. Connecting regions 440 may be included in any portion of the trench, and even the top trench area of the central region 420.

Figure 7:
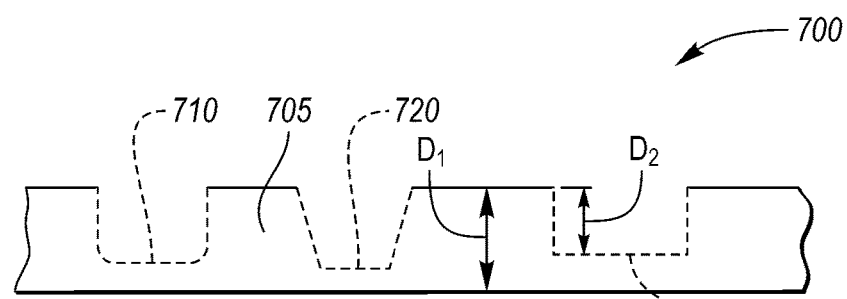
FIG. 7 is a partial schematic diagram of a mold tool rail, according to one or more embodiments.

Referring to FIG. 7, an embodiment of a mold tool rail 700 is shown. The mold tool rail 700 forms the non-continuous trench during molding of the seatback, and may have any shape based on the desired trench shape in the dual firmness seatback. The rail 700 forming the trench 415 may have varying height (resulting in a deeper or shallower trench) based on forming the foam cushions with dual firmness. The non-continuous trench may be formed by allowing bleed through of the foam through windows 710, 720, 730 in the mold tool rail body 705 during production of the vehicle seatback. To provide a rail in the mold tool capable of forming the connecting regions in the trench, the rail in the mold tool may include windows which allow foam to flow between portions of the mold die and form connecting regions during molding the seatback. For example, FIG. 7 shows windows 710, 720, and 730 as exemplary shapes for forming the connecting regions. The windows may vary in shape and size. As such, each connecting region may have a different composition, such as, but not limited to, completely side bolster foam (first density), completely central region foam (second density), or a blend of both. In some embodiments, the mold tool rail 700 may have windows of varying height to form different heights of connecting regions within the trench. The tool body 705 has a height of $D_1$ to form the trench between portions of varying firmness in the seatback. Window 730 may have a depth $D_2$, different from windows 710 and 720, thus allowing foam to fill a section of the trench during production and form a connecting region of a different height. Windows 710, 720, and 730 may be positioned, sized, and shaped according to the desired limitations in flexing between seatback portions. The depth (or height) of the connecting regions 440 within the trench 415 also may depend on the windows 710, 720, 730 and the depth of each window in the mold tool rail 700.

Figure 8A:
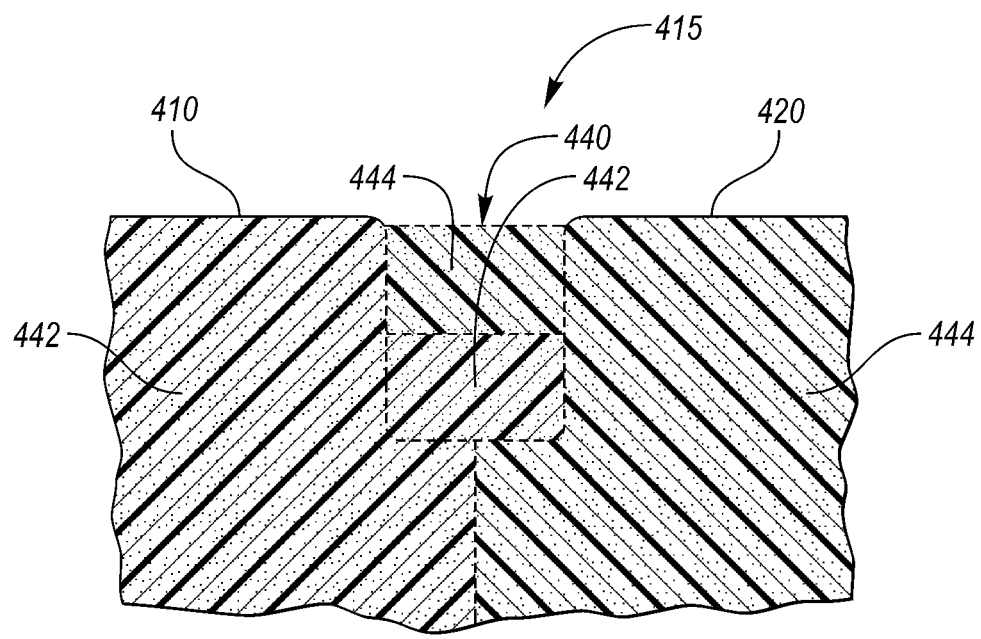
FIGS. 8A-B are partial schematic diagrams of cross sections of the trenches of dual firmness vehicle seatbacks, according to exemplary embodiments.
Figure 8B:
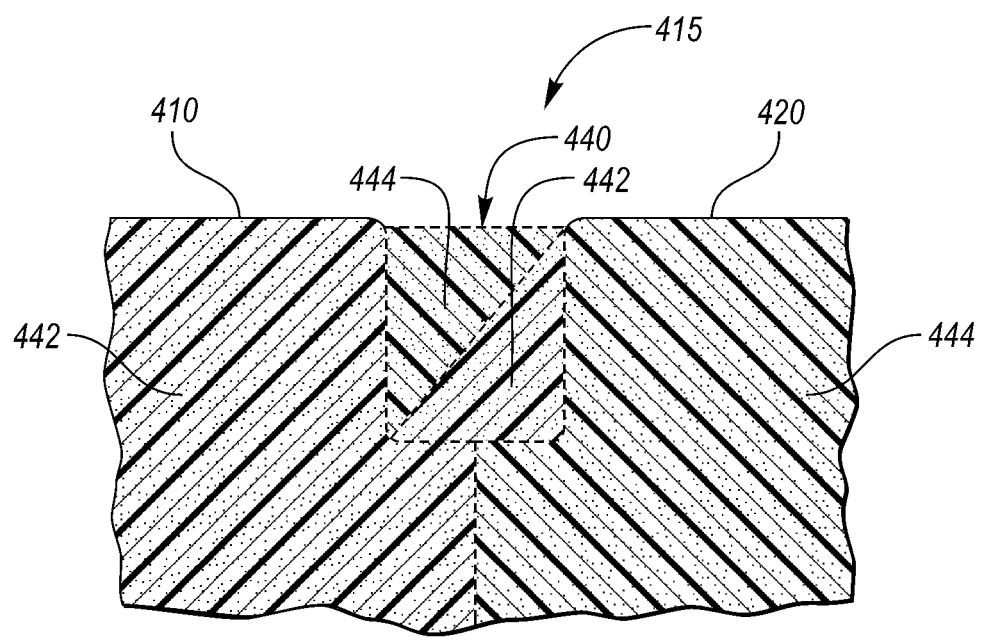

Referring to FIGS. 8A & 8B, embodiments of how the connecting region 440 is formed are shown. The connecting region 440 may form during molding as foam bleeds through the mold tool rail, as shown in FIG. 7. The non-continuous trench 415 between side bolster 410 and central region 420 includes connecting region 440 formed therebetween. The connecting region 440 may include foam 442 used to form side bolster 410, foam 444 used to form central region 420, or a different foam material. The different foam material may be a mixture or blend of the foam 442, 444 used for side bolster 410 and central region 420, respectively. Thus, the connecting region 440 may include foam from either side, or a mix or blend of both. The interface between the types of foam in the connecting region 440 may have any geometry or shape, as shown in FIGS. 8A-B, as formed during the molding process. In certain embodiments, connecting region 440 may include a combination of foams 442, 444 as based on the formation of the connecting region 440 during molding. For example, foam 442, as in the side bolster 410, may comprise 5-95% of the volume of the connecting region 440 in some embodiments, 10-90% in other embodiments, and 20-80% in yet some other embodiments. In other embodiments, foam 442, as in the side bolster 410, may comprise 40-60%, and in another embodiment 50%, of the volume of the connecting region 440. Similarly, foam 444, as in the central region 420, may comprise 5-95% of the volume of the connecting region 440 in some embodiments, 10-90% in other embodiments, and 20-80% in yet some other embodiments. In other embodiments, foam 444, as in central region 420, may comprise 40-60%, and in another embodiment 50%, of the volume of the connecting region 440. Each connecting region 440 may have the same or a different composition from another of the connecting regions. For example, in an embodiment, a first connecting region may include only foam 442, whereas a second connecting region may only include foam 444. In yet another example, a first connecting region may include 50% foam 442 and 50% foam 444, whereas a second connecting region may include 30% foam 442 and 70% foam 444. Similarly, the ILD of each connecting region 440 may vary from other connecting regions. As such, the ILD of each connecting region may independently be the ILD of the side bolster foam 442, the ILD of the central region foam 444, or a different ILD, based on the composition of the connection region 440.

The present disclosure relates to a dual firmness seatback having a non-continuous trench defining the border between two foam cushion regions of the seatback having different firmness, as measured by the ILD value of the region. The non-continuous nature of the trench provides stability and limits flexing of the foam cushion regions about the trench. In addition, the limited flexing due to the non-continuous trench may improve appearance of trim covers attached to the seatback by allowing design flexibility in the seatback while still achieving dual firmness for passenger support and comfort. For example, side bolsters with various contours can be employed freely without trim wrinkles forming on the seatback, or at least with fewer or smaller wrinkles forming than with similarly dimensioned trenches that are continuous.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
a seat bottom; and
a seatback disposed on the seat bottom, at least one of the seat bottom and seatback including a cushion comprising:
a first cushion region having a first initial load deflection value;
a second cushion region having a second initial load deflection value different from the first initial load deflection value;
a non-continuous trench between the first cushion region and the second cushion region and having a base forming a cavity therebetween; and
connecting regions disposed within the cavity above the base to inhibit flexing between the first and second cushion regions.

2. The vehicle seat assembly of claim 1, wherein the cushion is a foam cushion and the connecting regions comprise a first foam having the first initial load deflection value, a second foam having the second initial load deflection value, or a third foam having a third initial load deflection value different from the first and second.

3. The vehicle seat assembly of claim 2, wherein the third foam is a blend of the first and second foams, and the third initial load deflection value is between the first and second initial load deflection values.

4. The vehicle seat assembly of claim 1, wherein the connecting regions extend from the first cushion region to the second cushion region.

5. The vehicle seat assembly of claim 1, wherein the trench has a depth, and the connecting regions each independently fill 60-100% of the depth.

6. The vehicle seat assembly of claim 1, wherein each connecting region is independently 2-25 mm long.

7. The vehicle seat assembly of claim 1, at least one of the connecting regions is independently spaced apart by 2-25 mm from another of the connecting regions in the non-continuous trench.

8. The vehicle seat assembly of claim 1, wherein the first cushion region is 30-95% of the cushion.

9. The vehicle seat assembly of claim 1, wherein at least one of the connecting regions of the non-continuous trench is adjacent to a trim attachment feature.

10. A vehicle seat cushion comprising:
a first cushion region comprising a first foam having a first initial load deflection value;
a second cushion region comprising a second foam having a second initial load deflection value different from the first initial load deflection value;
a non-continuous trench defined by and between the first and second cushion regions and having a base forming a cavity therebetween; and
connecting regions within the cavity above the base, extending between the first cushion region and the second cushion region to inhibit flexing between the first and second cushion regions.

11. The vehicle seat cushion of claim 10, further including a trim attachment feature extending across the non-continuous trench and attached to both the first and second cushion regions.

12. The vehicle seat cushion of claim 10, wherein the connecting regions include the first foam, the second foam, or a third foam having a third initial load deflection different from the first and second.

13. The vehicle seat cushion of claim 10, wherein each connecting region is independently 2-25 mm long in the non-continuous trench.

14. The vehicle seat cushion of claim 10, wherein at least one of the connecting regions is independently spaced apart by 2-25 mm from another of the connecting regions in the non-continuous trench.

15. The vehicle seat cushion of claim 10, wherein the seat cushion is polyurethane and the first cushion region is 30-95% of the seat cushion.

16. The vehicle seat cushion of claim 10, wherein a difference in initial load deflection between the first initial load deflection value and the second initial load deflection value is a substantial variation.

17. The vehicle seat cushion of claim 16, wherein the substantial variation in initial load deflection between the first and second initial load deflection values is a 3-50% variation.

18. A method of making a vehicle seat assembly, the method comprising:
   providing a vehicle seat bottom;
   providing a vehicle seatback;
   disposing the vehicle seatback on the vehicle seat bottom to form the vehicle seat assembly; and
   attaching a trim cover to the seat assembly via at least one trim attachment feature, wherein at least one of the seat bottom and seatback includes a cushion comprising:
      a first cushion region having a first initial load deflection value;
      a second cushion region having a second initial load deflection value different from the first;
      a non-continuous trench and between the first and second cushion regions and having a base forming a cavity in the cushion therebetween; and
      connecting regions within the cavity above the base, extending between the first cushion region and the second cushion region to inhibit flexing between the first and second cushion regions.

19. The method of claim 18, wherein the connecting regions of the cushion comprise a first foam having the first initial load deflection value, a second foam having the second initial load deflection value, or a third foam having a third initial load deflection value different from the first and second initial load deflection values.

20. The method of claim 19, wherein the connecting regions are formed by molding the cushion with a mold tool rail configured to allow blending of the first foam and the second foam to form the third foam having the third initial load deflection value.

* * * * *